United States Patent
Adams

(10) Patent No.: US 8,211,276 B2
(45) Date of Patent: *Jul. 3, 2012

(54) METHODS AND SYSTEMS OF PRODUCING FUEL FOR AN INTERNAL COMBUSTION ENGINE USING A PLASMA SYSTEM AT VARIOUS PRESSURES

(75) Inventor: Charles Terrel Adams, Spicewood, TX (US)

(73) Assignee: Tetros Innovations, LLC, Sparks, NV (US)

( * ) Notice: Subject to any disclaimer, the term of this patent is extended or adjusted under 35 U.S.C. 154(b) by 1241 days.

This patent is subject to a terminal disclaimer.

(21) Appl. No.: 11/874,695

(22) Filed: Oct. 18, 2007

(65) Prior Publication Data

US 2008/0128267 A1 Jun. 5, 2008

Related U.S. Application Data

(60) Provisional application No. 60/853,233, filed on Oct. 20, 2006.

(51) Int. Cl.
*B29C 59/10* (2006.01)
*C01B 3/24* (2006.01)
(52) U.S. Cl. ........................................ 204/168; 423/650
(58) Field of Classification Search .................. 204/168; 423/650
See application file for complete search history.

(56) References Cited

U.S. PATENT DOCUMENTS

| | | | |
|---|---|---|---|
| 5,409,784 A | 4/1995 | Bromberg et al. | |
| 5,425,332 A | 6/1995 | Rabinovich et al. | |
| 5,912,424 A | 6/1999 | Judkins et al. | |
| 5,925,168 A | 7/1999 | Judkins et al. | |
| 5,972,077 A | 10/1999 | Judkins et al. | |
| 6,245,309 B1 | 6/2001 | Etievant et al. | |
| 6,322,757 B1 | 11/2001 | Cohn et al. | |
| 6,651,597 B2 | 11/2003 | Daniel et al. | |
| 6,793,898 B2 | 9/2004 | Brown et al. | |
| 6,793,899 B2 | 9/2004 | Bromberg et al. | |
| 6,804,950 B2 | 10/2004 | Kong et al. | |
| 6,851,413 B1 | 2/2005 | Tamol, Sr. | |
| 6,881,386 B2 | 4/2005 | Rabinovich et al. | |

(Continued)

FOREIGN PATENT DOCUMENTS

EP 1193218 4/2002

(Continued)

OTHER PUBLICATIONS

Bromberg et al., "Compact plasmatron-boosted hydrogen generation technology for vehicular applications", International Journal of Hydrogen Energy, 24 (1999), 341-350.*

(Continued)

*Primary Examiner* — Kishor Mayekar
(74) *Attorney, Agent, or Firm* — Meyertons, Hood, Kivlin, Kowert & Goetzel, P.C.; Eric B. Meyertons

(57) ABSTRACT

Systems and methods for production of fuel for an internal combustion engine are described herein. Systems may include a plasma reformer and an internal combustion engine. The plasma reformer may produce a plasma at pressures between about 0.3 atmospheres and about 5 atmospheres. The plasma reformer may produce a gas stream from the liquid feed. The gas stream may include molecular hydrogen and carbon oxides. At least a portion of the gas stream may be provided to an internal combustion engine.

19 Claims, 7 Drawing Sheets

U.S. PATENT DOCUMENTS

| | | | |
|---|---|---|---|
| 6,903,259 | B2 | 6/2005 | Ciray et al. |
| 6,955,162 | B2 | 10/2005 | Larson et al. |
| 6,962,679 | B2 * | 11/2005 | Josephson et al. ............ 423/241 |
| 6,976,353 | B2 | 12/2005 | Daniel et al. |
| 7,263,967 | B2 | 9/2007 | Hotta et al. |
| 7,442,364 | B1 | 10/2008 | Wang |
| 7,487,764 | B2 | 2/2009 | Lee |
| 7,736,400 | B2 * | 6/2010 | Rabovitser et al. ......... 48/197 R |
| 7,946,258 | B2 * | 5/2011 | Adams .............................. 123/3 |
| 2002/0098133 | A1 | 7/2002 | Jewell et al. |
| 2002/0175084 | A1 | 11/2002 | Futamura et al. |
| 2003/0084613 | A1 | 5/2003 | Futamura |
| 2003/0186804 | A1 | 10/2003 | Wagner et al. |
| 2004/0118046 | A1 | 6/2004 | Williamson et al. |
| 2004/0120887 | A1 | 6/2004 | Sekine et al. |
| 2004/0148860 | A1 | 8/2004 | Fletcher |
| 2004/0176245 | A1 | 9/2004 | Hagemeyer et al. |
| 2004/0206618 | A1 | 10/2004 | Voecks et al. |
| 2005/0019714 | A1 | 1/2005 | Platts et al. |
| 2005/0022450 | A1 | 2/2005 | Tan et al. |
| 2006/0059897 | A1 | 3/2006 | Benz et al. |
| 2006/0096573 | A1 | 5/2006 | Jonson |
| 2006/0124445 | A1 | 6/2006 | Labrecque et al. |
| 2006/0194694 | A1 | 8/2006 | Hagemeyer et al. |
| 2006/0196483 | A1 | 9/2006 | Magyari |
| 2007/0000454 | A1 | 1/2007 | Wang |
| 2007/0059235 | A1 | 3/2007 | Voecks et al. |
| 2007/0187372 | A1 | 8/2007 | Rabinovich et al. |
| 2007/0193518 | A1 | 8/2007 | Shiina et al. |
| 2007/0259228 | A1 | 11/2007 | Hartvigsen et al. |
| 2008/0107592 | A1 | 5/2008 | Adams |
| 2008/0131360 | A1 | 6/2008 | Adams |
| 2008/0131744 | A1 | 6/2008 | Adams |
| 2008/0135807 | A1 | 6/2008 | Adams |
| 2008/0138676 | A1 | 6/2008 | Adams |
| 2009/0035619 | A1 | 2/2009 | Adams |

FOREIGN PATENT DOCUMENTS

| | | |
|---|---|---|
| WO | 98/44289 | 3/1998 |
| WO | 03012269 | 2/2003 |

OTHER PUBLICATIONS

Huang et al. entitled "Optimization of a Pressure Swing Adsorption Process for Hydrogen Production from Plasma Reactor Gas" 57th Canadian Chemical Engineering Conference Oct. 2007, http://abstracts.csche2007.ca/00000189.htm.

Aubry et al., "On the use of a non-thermal plasma reactor for ethanol steam reforming" Chemical Engineering Journal, 2005, vol. 106.

Song entitled, "Overview of Hydrogen Production Options for Hydrogen Energy Development, Fuel-Cell Fuel Processing and Mitigation of CO2 Emissions," Proc. 20th International Pittsburgh Coal Conference, 2003.

Nozaki et al.,"Kinetic Analysis of the Catalyst and Nonthermal Plasma Hybrid Reaction for Methane Steam Reforming," American Chemical Society, web publication Jul. 13, 2007.

Bromberg, "Plasmatron Fuel Reformer Development and Internal Combustion Engine Vehicle Applications", www.eere.energy.gov/vehiclesandfuels/pdfs/deer_2004/session2/2004_deer_bromberg.pdf.

Bromberg et al., "Hydrogen Manufacturing Using Low Current, Non-Thermal Plasma Boosted Fuel Converters," Plasma Science and Fusion Center Research Report 01-1.

Deminsky et al., "Plasma-Assisted Production of Hydrogen From Hydrocarbons," Pure and Applied Chemistry, IUPAC, 2002.

Sekine et al., "A novel method for hydrogen production from liquid ethanol/water at room temperature," Chem. Commun., 2005.

Futamura et al., "Steam reforming of aliphatic hydrocarbons with nonthermal plasma," IEEE Transactions, Nov.-Dec. 2004 (hereinafter "Futamura").

Co-pending U.S. Appl. No. 11/874,701 entitled "Methods and Systems of Producing Molecular Hydrogen Using a Plasma System in Combination With an Electrical Swing Absorption Separation System" to Adams filed Oct. 18, 2007.

Co-pending U.S. Appl. No. 11/874,711 entitled "Methods and Systems of Producing Molecular Hydrogen Using a Plasma System in Combination With a Membrane Separation System" to Adams filed Oct. 18, 2007.

Co-pending U.S. Appl. No. 11/874,721 entitled "Methods and Systems of Producing Molecular Hydrogen Using a Plasma System At Various Pressures" to Adams filed Oct. 18, 2007.

Co-pending U.S. Appl. No. 11/874,716 entitled "Methods and Systems of Producing Molecular Hydrogen Using a Low-Temperature Plasma System" to Adams filed Oct. 18, 2007.

Co-pending U.S. Appl. No. 11/874,729 entitled Methods and Systems for Producing Fuel for an Internal Combustion Engine Using a Low-Temperature Plasma System to Adams filed Oct. 18, 2007.

Co-pending U.S. Appl. No. 11/874,740 entitled Methods and Systems of Producing Fuel for an Internal Combustion Engine Using a Plasma System in Combination With a Purification System to Adams filed Oct. 18, 2007.

U.S. Patent and Trademark Office, "Communication" for U.S. Appl. No. 11/874,721, mailed Oct. 13, 2010.

U.S. Patent and Trademark Office, "Communication" for U.S. Appl. No. 11/874,729, mailed Aug. 21, 2009.

U.S. Patent and Trademark Office, "Communication" for U.S. Appl. No. 11/874,729, mailed Apr. 7, 2010.

European Patent and Trademark Office "Communication" for European Application No. 07873557 mailed Apr. 16, 2010, 7 pages.

European Patent and Trademark Office "Communication" for European Application No. 07873558 mailed Apr. 16, 2010, 8 pages.

U.S. Patent and Trademark Office, "Communication" for U.S. Appl. No. 11/874,740, mailed Jun. 14, 2010.

European Patent and Trademark Office "Communication" for European Application No. 07873557.8 mailed Nov. 4, 2010, 7 pages.

European Patent and Trademark Office "Communication" for European Application No. 07873558.6 mailed Nov. 4, 2010, 8 pages.

Sekine et al.; "nonequilibrium pulsed Discharge: A Novel Method for Steam Reforming of Hydrocarbons of Alcohols", Energy Fuels, online, vol. 18, No. 2. Jan. 1, 2004, pp. 455-459.

PCT International Search Report and Written Opinion for International Application No. PCT/US2007/081827, mailed Jan. 13, 2009; 16 pages.

PCT International Search Report and Written Opinion for International Application No. PCT/US2007/081824, mailed Jan. 13, 2009; 18 pages.

Chinese Office Action for Chinese Patent Application No. 2007800466245, mailed Aug. 3, 2011, 6 pages.

U.S. Patent and Trademark Office, "Communication" for U.S. Appl. No. 11/874,729, mailed Nov. 4, 2011.

U.S. Patent and Trademark Office, "Communication" for U.S. Appl. No. 11/874,701, mailed Apr. 25, 2011.

U.S. Patent and Trademark Office, "Communication" for U.S. Appl. No. 11/874,711, mailed May 18, 2011.

U.S. Patent and Trademark Office, "Communication" for U.S. Appl. No. 11/874,716, mailed Mar. 9, 2011.

U.S. Patent and Trademark Office, "Communication" for U.S. Appl. No. 11/874,721, mailed Apr. 15, 2011.

U.S. Appl. No. 60/798,863 by Harvigsen et al. filed May 8, 2006 (16 pages).

Communication from European Patent Office Summon to attend oral proceedings pursuant to Rule 115(1) EPC for EP Application No. 07873558, mailed Jul. 11, 2011, 7 pages.

U.S. Patent and Trademark Office, "Communication" for U.S. Appl. No. 11/874,711, mailed Oct. 19, 2011.

U.S. Patent and Trademark Office, "Communication" for U.S. Appl. No. 11/874,701, mailed Oct. 27, 2011.

Chinese Office Action for Chinese Patent Application No. 200780046607.1, mailed Sep. 14, 2011, 15 pages.

U.S. Patent and Trademark Office, "Communication" for U.S. Appl. No. 11/874,716, mailed Aug. 11, 2011.

European Patent Office, "Minutes of Oral Hearing", for European Patent Application No. 07 873 558.6-1270, Jan. 12, 2011, 13 pages.

* cited by examiner

METHODS AND SYSTEMS OF PRODUCING FUEL FOR AN INTERNAL COMBUSTION ENGINE USING A PLASMA SYSTEM AT VARIOUS PRESSURES

PRIORITY CLAIM

This application claims priority to U.S. Provisional Patent Application No. 60/853,233 entitled "METHOD OF HYDROGEN PRODUCTION USING NON-THERMAL PLASMA REFORMING OF OXYGENATED OR NON-OXYGENATED HYDROCARBONS" filed Oct. 20, 2006.

BACKGROUND

1. Field of the Invention

The present invention relates to fuel generation for an internal combustion engine. More particularly, the invention relates to systems and methods for molecular hydrogen generation using a plasma system for use as a fuel for internal combustion engines.

2. Brief Description of the Related Art

In response to the growing concern over emissions from internal combustion engines as a source of air pollution, alternative fuels are becoming more acceptable for use in internal combustion engines. One such alternate fuel is molecular hydrogen. Molecular hydrogen may be used as a fuel for internal combustion engines, or as a fuel for fuel cells that generate power that can be used in place of or in combination with an internal combustion engine. Since molecular hydrogen is not a natural resource, it is typically generated from one or more compounds containing molecular hydrogen. For example, molecular hydrogen may be generated by steam reforming of hydrocarbons.

Steam reforming of hydrocarbons is an endothermic process. Therefore, a source of heat must be available to run the steam reforming process. The processing equipment needed and/or the time for heating of the reactor to generate a temperature sufficient to generate molecular hydrogen using a steam methane reforming process does not make steam reforming of hydrocarbons amenable for rapid-start, compact, portable applications (for example, automobiles and/or buses).

U.S. Pat. No. 6,976,353 to Daniel et al.; U.S. Pat. No. 6,903,259 to Ciray et al.; U.S. Pat. No. 6,804,950 to Kong et al.; and U.S. Pat. No. 6,793,899 to Bromberg et al. and U.S. Published Patent Application Nos. 2007/0059235 to Voecks et al.; 2004/0206618 to Voecks et al.; 2004/0148860 to Fletcher, each of which are incorporated herein by reference, describe reforming hydrocarbons and/or gaseous hydrocarbons using plasma.

Since molecular hydrogen is a produced resource and hydrogen resources such as crude oil are becoming diminished, economical and efficient methods, and systems to generate fuel for internal combustion engines from alternate sources of feed are desirable.

SUMMARY

Systems and methods for producing fuel from a low-temperature plasma reformer are described herein.

In some embodiments, a system for production of molecular hydrogen includes a plasma reformer. The plasma reformer may receive a fluid feed and produce a gas stream from the liquid feed. The plasma reformer may generate a plasma at a temperature of at most about 400° C. In some embodiments, a pressure in the plasma reformer is between about 0.3 atmospheres and about 5 atmospheres. The produced gas stream may include molecular hydrogen and carbon oxides.

In some embodiments, the plasma reformer is in communication with a separation system. The separation system may include an electrical swing adsorption separation system and/or a membrane separation system. The separation system may remove at least a portion of the carbon oxides from the gas stream to produce a gas stream enriched in molecular hydrogen as compared to the gas stream entering the separation system.

In some embodiments, the plasma reformer and/or separation system may be coupled to an internal combustion engine. Molecular hydrogen produced in the plasma reformer may be fed to an internal combustion engine, which may combust the molecular hydrogen as fuel. In some embodiments, the gas stream of the plasma reformer is mixed with an alternate fuel and the mixture is provided as fuel for the internal combustion engine.

In some embodiments, the gas stream of the plasma reformer is contacted with a water gas shift catalyst. Contact of the gas stream with the water gas shift catalyst may convert a portion of the carbon monoxide in the gas stream to a molecular hydrogen enriched gas stream as compared to the gas stream prior to contact with the water gas shift catalyst. The molecular hydrogen enriched gas stream may be provided to an internal combustion engine.

Methods to produce fuel for an internal combustion engine using the above described systems are also described herein. In some embodiments, a method to produce fuel for an internal combustion engine may include providing a liquid feed to a plasma reformer. In the plasma reformer, the liquid feed may be converted to a gas stream that includes molecular hydrogen. In some embodiments, the gas stream also includes carbon monoxide and/or carbon dioxide. The gas stream may be provided to an internal combustion engine. In some embodiments, the gas stream is provided to a separation system before it is sent to an internal combustion engine. The separation system may separate the molecular hydrogen from other components in the gas stream to form a molecular hydrogen stream. The molecular hydrogen stream may be provided to an internal combustion engine. In some embodiments, the molecular hydrogen stream is mixed with an alternate fuel to form a fuel mixture. The fuel mixture may be provided to the internal combustion engine.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings.

Figure 1:
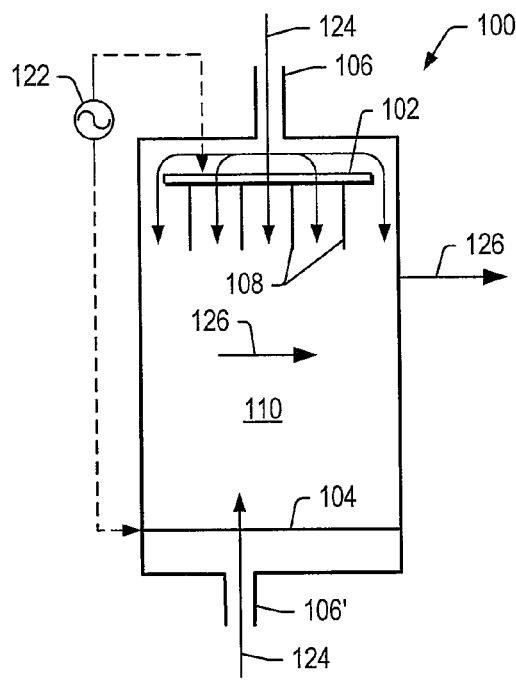
FIG. 1 depicts an embodiment of a plasma reformer system.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

Methods and systems for making and using fuel for an internal combustion engine using a low-temperature plasma reformer are described herein. Selected terms used herein are listed below.

"Carbon oxides" refers to carbon monoxide and/or carbon dioxide.

"Gas" refers to one or more compounds that do not condense at 0.101 MPa and 25° C.

"Liquid" refers to one or more compounds that condense at 0.101 MPa and 25° C.

"Low-temperature plasma" refers to plasma generated at temperatures of at most about 400° C.

"Molecular hydrogen" refers to $H_2$.

"Oxygenated hydrocarbons" refers to one or more compounds that have carbon, hydrogen and oxygen in their composition. Oxygenated hydrocarbons include, but are not limited to, alcohols (for example, methanol and/or ethanol), aldehydes, ketones, carboxylic acids, peroxides, esters, or mixtures thereof.

"Periodic Table" refers to the Periodic Table as defined by the International Union of Pure and Applied Chemistry, June 2007.

Due to the diminishing supply of hydrocarbons as a fuel source, the use of liquid oxygenated hydrocarbons (for example, alcohols and/or alcohols mixed with fossil fuel) as a fuel source has increased. Bio-derived renewable liquid fuel that has a high volumetric energy density may be a suitable alternate source of feed. For example, liquid oxygenated hydrocarbons derived from natural sources such as sugar, cellulose, or carbohydrates have been found suitable for use as a fuel source. Renewable liquid fuels may not require specially constructed vessels for transportation. For example, liquid oxygenated hydrocarbons may be safer and more easily transported to isolated and/or remote areas of the world than gaseous hydrocarbons since they do not require pressurized vessels. In addition, liquid oxygenated hydrocarbons may be more accessible as a fuel source than hydrocarbons currently produced from crude oil. For example, ethanol produced from sugar cane may be easier to produce for some areas of the world than producing hydrocarbons from a formation.

Liquid oxygenated hydrocarbons may provide a high concentration of molecular hydrogen. For example, reformation of ethanol in the presence of water produces carbon monoxide and molecular hydrogen as shown below:

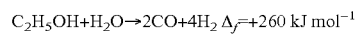

$$C_2H_5OH + H_2O \rightarrow 2CO + 4H_2 \quad \Delta_f = +260 \text{ kJ mol}^{-1}$$

Because the reaction is endothermic (a positive heat of formation), reformation processes for alcohols and/or hydrocarbons are typically performed at temperatures ranging from about 700° C. to about 1000° C. A by-product of the reformation reaction is carbon monoxide. To increase the yield of molecular hydrogen, carbon monoxide may be converted to carbon dioxide and molecular hydrogen using the water gas shift reaction as shown below:

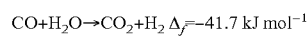

$$CO + H_2O \rightarrow CO_2 + H_2 \quad \Delta_f = -41.7 \text{ kJ mol}^{-1}$$

The endothermic characteristic of the reformation reaction and the need to separate and/or convert the carbon monoxide from the molecular hydrogen for use in internal combustion engines detracts from using conventional oxygenated hydrocarbon reforming processes to produce molecular hydrogen as a fuel for internal combustion engines.

In some embodiments, low-temperature plasma is used to convert liquid oxygenated hydrocarbons and/or a mixture of liquid oxygenated hydrocarbons and hydrocarbons to a gas stream that includes, but is not limited to, molecular hydrogen, carbon monoxide, and hydrocarbons having a carbon number of at most 3, without a substantial requirement for heat. In some embodiments, a mixture of liquid oxygenated hydrocarbons and water may be used as a feed. A ratio of liquid oxygenated hydrocarbons to water ratio may be about 5:1, about 4:1 to about 3:1, or about 2:1. In some embodiments, a ratio of water to liquid oxygenated hydrocarbon is about 1:1, 2:1, 3:1, 10:1, 30:1 or 50:1.

The generated fuel (for example, molecular hydrogen) may be provided to an internal combustion engine. Combustion of the generated fuel in the internal combustion engine may produce minimal emission or lower emission than combustion of hydrocarbons (for example, gasoline). Injection of molecular hydrogen into an intake manifold and/or one or more cylinder of an internal combustion engines may enhance the combustion reaction. Molecular hydrogen addition to the intake air-fuel charge and/or one or more cylinders increases the octane rating of the combined fuel charge and enhances the flame velocity, thus permitting the engine to operate with more advanced ignition timing, a higher compression ratio, and a leaner air-to-fuel mixture than with conventional fuels. As a result, the thermal efficiency of the engine (amount of fuel to move a known distance) may increase by at least at least 10%, at least 20%, at least 30%, or at least 50%. As thermal efficiency of the engine increases, fuel economy of may also increase as compared to a conventional engine. Total efficiency refers thermal efficiency time mechanical efficiency of the engine. Thermal efficiency refers to the percentage of energy taken from the combustion which is actually converted to mechanical work. Mechanical efficiency refers the percentage of energy that the engine puts out after subtracting mechanical losses such as friction, compared to what the engine would put out with no power loss.

Low-temperature plasma may be generated by a dielectric barrier discharge generator, a pulsed corona discharge-type plasma generator, a silent discharge plasma generator, a radio frequency generator, a microwave generator, or combinations thereof. In some embodiments, plasma is generated by pulsing alternating current (AC) or pulsing direct current (DC). This type of plasma generation does not require an arc to generate the plasma. Plasma generated using non-arcing techniques may inhibit the formation of undesirable products, for example, coke and/or hydrocarbons with a carbon number of at least 3.

Figure 2:
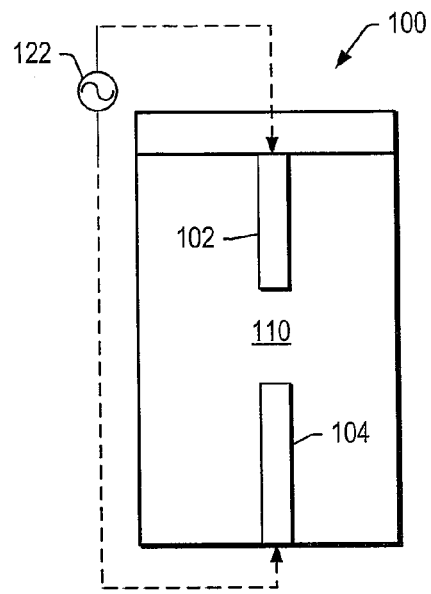
FIG. 2 depicts an embodiment of an electrode configuration in a plasma reformer.

FIG. 1 depicts an embodiment of a plasma reformer system. As shown in FIG. 1, plasma reformer 100 includes electrode 102, electrode 104, and ports 106, 106'. As shown, electrode 102 may include one or more elongated members 108. In an alternate embodiment electrode 102 and/or electrode 104 include one or more elongated members 108. Electrode 102 and electrode 104 form an electrical circuit that generates plasma. In some embodiments, electrode 102 serves as an anode and electrode 104 serves as the cathode of the electrical circuit. In other embodiments, electrode 104 serves as an anode and electrode 102 serve as the cathode of the electrical circuit. FIG. 2 depicts an alternate embodiment of an electrode configuration in a plasma reformer. As shown in FIG. 2, electrodes 102 and 104 are single electrodes positioned opposite one another.

Electrode 102 and electrode 104 are positioned to form gap 110. A height of gap 110 may range from about 1 millimeter (mm) to about 100 mm, about 5 mm to 80 mm or from about 10 mm to about 50 mm. In some embodiments, a height of gap 110 is at most about 20 mm. Gap 110 should have sufficient dimensions to sustain plasma for generating molecular hydrogen from liquid oxygenated hydrocarbons. It should be understood that an orientation of electrode 102 relative to electrode 104 (see FIGS. 1-4) may be of any orientation sufficient to sustain plasma in gap 110.

Figure 3A:
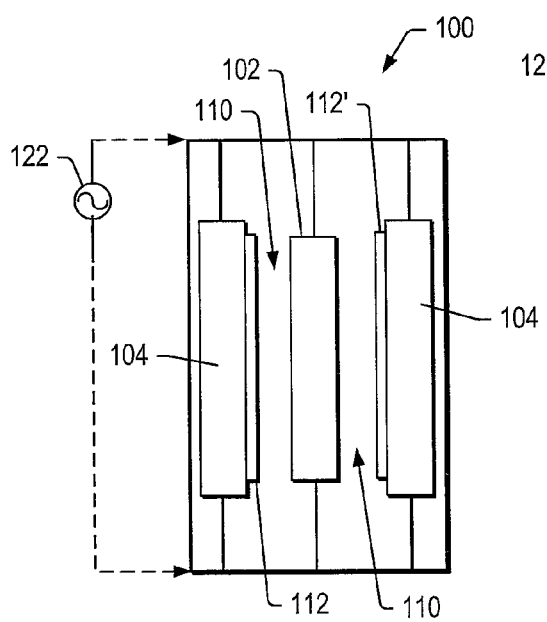
FIGS. 3A and 3B depict embodiments of a plasma reformer that includes dielectric barriers.
Figure 3B:
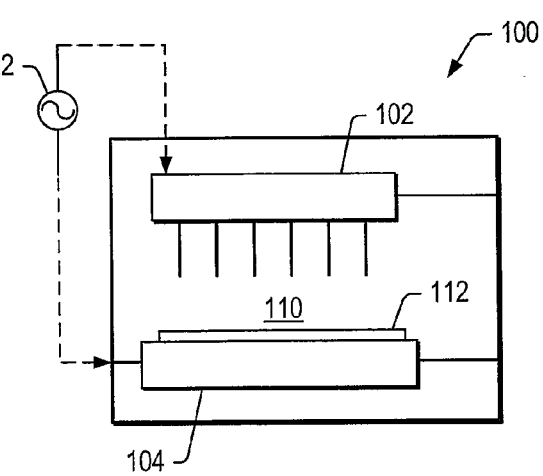

In some embodiments, one or more electrodes may include one or more dielectric barriers. FIGS. 3A and 3B depict embodiments of a plasma reformer that includes dielectric barriers. As shown in FIG. 3A, dielectric barriers 112, 112' may be connected to the outer surface of electrode 104. Dielectric barriers 112, 112' may be formed by metallization of the surface of electrode 104 with one or more electrically conductive materials. Gap 110 is formed between dielectric barriers 112, 112' and electrode 102. Dielectric barriers 112, 112' be formed of materials including, but not limited to, a ceramic material of high dielectric constant and/or titanium. FIG. 3B depicts plasma reformer 100 with one dielectric barrier. Use of dielectric barriers may enhance the activation energy of the plasma. An enhanced activation energy may assist in pushing the reforming reaction to completion, thus more hydrogen per gram of feed is formed.

Figure 4:
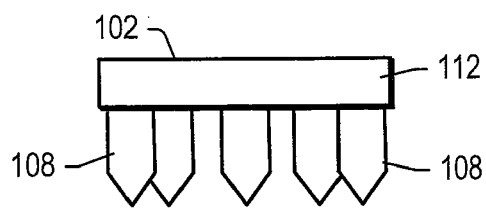
FIG. 4 depicts an embodiment of an electrode that includes one or more pointed elongated members.
Figure 5:
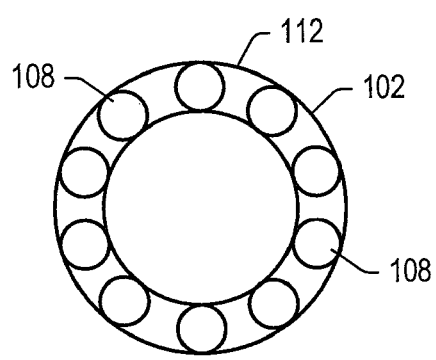
FIG. 5 depicts bottom view of an embodiment of an electrode that includes one or more convex elongated members.

Electrode 102 and electrode 104 may be manufactured from stainless steel, carbon, or any material suitable for transfer of electrical charge that is sufficient to generate plasma. Dimensions of electrode 102 and electrode 104 should be sufficient to generate and sustain plasma in gap 110. Electrode 102 may be configured to allow current to flow from the top of the electrode and out the bottom of the electrode. FIG. 4 depicts an embodiment of an electrode that includes one or more pointed elongated members. FIG. 5 depicts bottom view of an embodiment of an electrode that includes one or more convex elongated members. As shown in FIG. 4, elongated members 108 have a pointed end. Bottom end of elongated members 108 may be convex as shown in FIG. 5. A convex end or rounded end may allow for minimal corrosion and/or pitting of electrodes 102. Corrosion and/or pitting of the electrode surface may be caused by the electrical discharge during plasma generation. The shape of a bottom end of electrodes 102 may be any dimension suitable to sustain plasma in gap 110 and/or inhibit fouling of the electrode. Elongated members 108 may be hollow to allow fluid to pass into gap 110. Elongated members 108 may be affixed to support 116 using techniques known in the art (for example, glued, soldered, welded, or combinations thereof). Elongated members 108 and support 116 may be formed from one material. Electrode 102 may include from about 1 to about 100, from about 2 to about 50, or from about 3 to about 20 elongated members.

Figure 6:
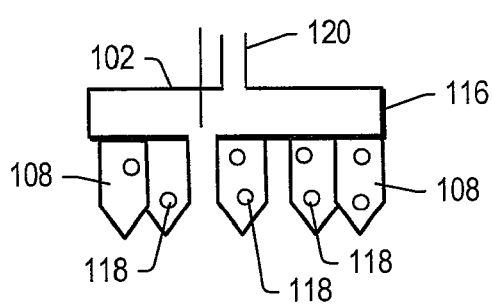
FIG. 6 depicts an embodiment of an electrode that includes openings.

In some embodiments, electrodes may include openings in one or more surfaces of the electrode. For example, sides of the electrodes may include openings and/or a support of an electrode may include openings. A shape of openings in the electrodes may be any shape (for example, elliptical, spherical, rectangular, polygon, or combinations thereof). In other embodiments, a surface of the electrodes may include grooves. Openings in the electrodes may allow dispersal of fluid into the gap during plasma generation. For example, liquid feed may enter the gap through one of the electrodes and gas may exit through openings of the opposite electrode. FIG. 6 depicts an embodiment of an electrode that includes openings. As shown in FIG. 6, elongated members 108 may include openings 118. Support 116 may include inlets 120 to allow fluid to enter gap 110. In some embodiments, support 112 is a metal frit.

Figure 7:
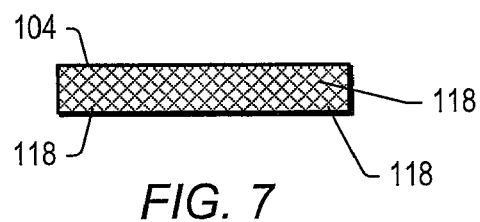
FIG. 7 depicts an embodiment of top view of an electrode.

FIG. 7 depicts an embodiment of top view of an electrode. As shown in FIG. 7, electrode 104 includes openings 118. For example, electrode 104 may be a metal frit. Electrode 104 may be any shape and/or size sufficient to sustain plasma in gap 110.

As shown in FIGS. 1-3 and 8-16, power supply 122 supplies sufficient current to electrodes 102 and 104 to produce plasma at temperatures of at most about 400° C., at most about 300° C., or at most about 200° C. In some embodiments, the power supply may supply direct current, alternating current or a combination of direct and alternating current. In some embodiments, temperature of the plasma ranges from ambient temperature (25° C.) to about 400° C., from about 50° C. to about 300° C., or from about 100° C. to about 200° C. In some embodiments, the power supply may supply direct current, alternating current or a combination of direct and alternating current. In some embodiments, temperature of the plasma ranges from ambient temperature (25° C.) to about 400° C., from about 50° C. to about 300° C., or from about 100° C. to about 200° C. Use of a low-temperature plasma allow for a "rapid start-up" of the plasma system because the system may not require a significant amount of time to obtain the temperature required to generate heat necessary to produce molecular hydrogen. Rapid start-up plasma system may allow fuel to be readily available to an internal combustion engine when starting the engine.

As shown, alternating current is supplied from power supply 122. AC power supply 122 may pulse the current between electrodes 102 and 104 to generate plasma. Pulsation of AC power may inhibit formation of hydrocarbons from liquid oxygenated hydrocarbons when the liquid oxygenated hydrocarbons contact the plasma generated by the pulsed AC power.

Figure 8:
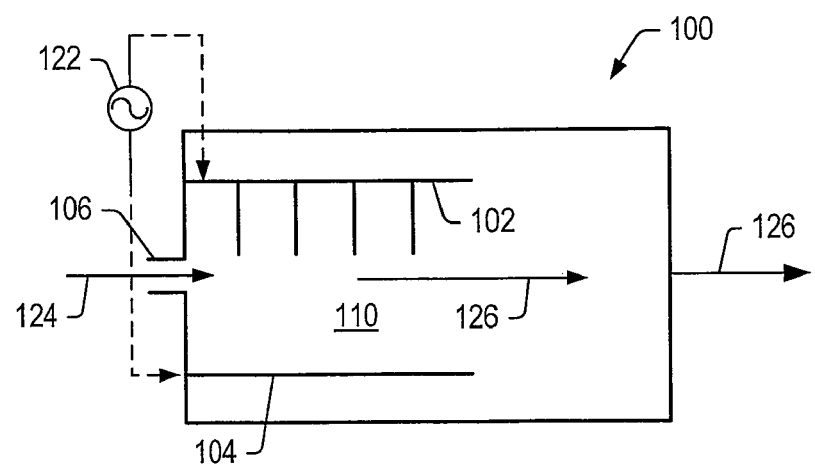
FIG. 8 depicts a schematic representation of an embodiment of flow through a plasma reformer.

As plasma is generated in gap 110, feed 124 may be converted to gas stream 126. Gas stream 126 may exit plasma reformer through one or more ports. Gas stream 126 may include, but is not limited to, molecular hydrogen, hydrocarbons, carbon oxides, water, or mixtures thereof. As shown in FIGS. 1 and 8, feed 124 may enter plasma reformer through port 106 and/or port 106'. As shown in FIG. 1, feed 124 flows through and/or around electrode 102 and/or electrode 104 into gap 110. As shown, flow of feed 124 is parallel to perpendicular to electrode 104. As shown in FIG. 8, feed 124 flows through plasma reformer 100 into gap 110 parallel to electrode 104. It should be understood that feed may flow into gap 110 in any direction and through one or more ports in plasma reformer 100. Delivery of feed 124 to plasma reformer may be performed using any technique known in the art (for example, pumps, sprayers, atomizers, or combinations thereof).

In some embodiments, power supply 122 and plasma reformer 100 are connected to a controller. The controller may control operation of power supply 122 and plasma reformer 100. For example, the controller may control the pulse interval of the electrical current supplied to the electrodes and/or the flow of the feed to the plasma reformer.

As shown in FIGS. 9, 10, 14-16, and 19, plasma reformer 100 may include catalyst system 128. Catalyst system 128 may be a water gas shift catalyst. Catalyst system 128 may include, but is not limited to, one or more metals from Column 7, Column 10, Column 14 of the Periodic Table and/or one or more compounds of one or more Column 7 metal, Column 10 metal, Column 14 metals or mixtures thereof. Examples of metals include, copper, nickel, tin, platinum, zinc, rhenium, or mixtures thereof. An amount of metal may range from about 0.001 grams to about 0.3 grams, from about 0.01 grams to about 0.2 grams, or from about 0.05 to about 0.1 grams of metal per gram of catalyst. In some embodiments, catalyst system 128 may include one or more catalysts. For example, catalyst system 128 may include a platinum catalyst and a rhenium/platinum catalyst.

In some embodiments, the catalyst is a supported catalyst. The support may be one or more mineral oxides, alumina, titanium oxide, cerium oxide, or any suitable support for water shift gas catalysts. The metals may be impregnated on the support and/or mulled with support to form the water gas shift catalyst. In some embodiments, a surface area of the catalyst may range from about 50 m$^2$/g to about 500 m$^2$/g, from about 100 m$^2$/g to about 400 m$^2$/g, or from about 200 m$^2$/g to about 300 m$^2$/g. In certain embodiments, the catalyst may be an unsupported catalyst.

Figure 9:
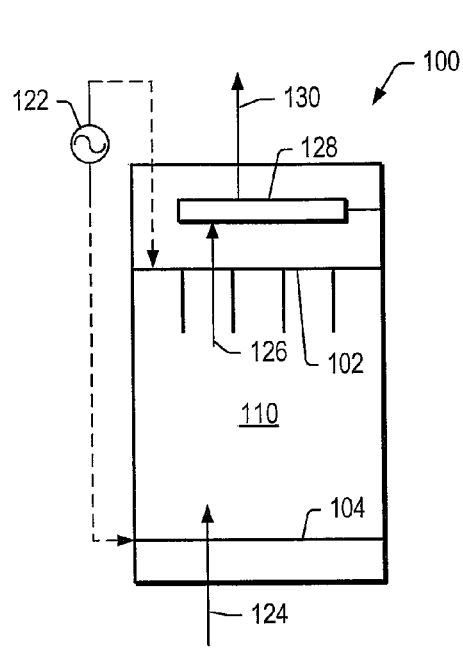
FIG. 9 depicts an embodiment of a plasma reformer system that includes a catalyst.

FIG. 9 depicts an embodiment of a plasma reformer system that includes a catalyst system. As shown in FIG. 9, catalyst system 128 may be positioned proximate gap 110. Liquid feed 124 (for example, aqueous alcohol) may enter gap 110. Generation of plasma in gap 110 may convert liquid feed 124 to gas stream 126. Gas stream 126 may include gas and trace amounts of feed. As gas stream 126 is generated, it may contact catalyst system 128. Contact of gas stream 126 with catalyst system 128 in the presence of the liquid feed 124 may allow the carbon monoxide in gas stream 126 to be converted to carbon dioxide and molecular hydrogen to form molecular hydrogen enriched gas stream 130 as compared to the gas stream prior to contact with the catalyst system. Molecular hydrogen enriched stream 130 may include, but is not limited to, molecular hydrogen, carbon dioxide, hydrocarbons, and a minimal amount of liquid feed or mixtures thereof. In some embodiments, catalyst system 128 is positioned in a bed and the gas stream generated by reformation of liquid oxygenated hydrocarbons passes through the catalyst bed. In some embodiments, catalyst system 128 includes one or more catalysts in a stacked bed configuration.

Temperatures in plasma reformer 100 may range from about 25° C. to about 400° C., about 500° C. to about 300° C., or about 100° C. to about 200° C. Temperatures of plasma in plasma reformer 100 may be at most about 400° C., at most about 300° C. or at most about 200° C.

In contrast, to some plasma generator that require atmospheric pressure and/or sub-atmospheric pressure to sustain the plasma, plasma reformer may be operated at pressure greater than atmospheric while sustaining the plasma. Pressure in plasma reformer 100 may range from about 0.3 atm to about 5 atm, from about 0.5 atm to about 2 atm, or from about 1 atm to 3 atm. Operating plasma reformer 100 at a pressure greater than atmospheric may allow for generation of molecular hydrogen with minimal or substantially no hydrocarbon formation and/or carbon monoxide formation. Operation of plasma reformer 100 at a pressure greater than atmospheric may allow the pressurized gas stream generated in the plasma reformer to be used directly in an internal combustion engine without further pressurization.

In some embodiments, one or more portions of plasma reformer 100 are insulated. Insulating portions of plasma reformer 100 may allow for more efficient generation of molecular hydrogen with minimal or substantially no carbon monoxide formation, and without the formation of coke and/or undesirable hydrocarbons in the plasma reformer.

Figure 10:
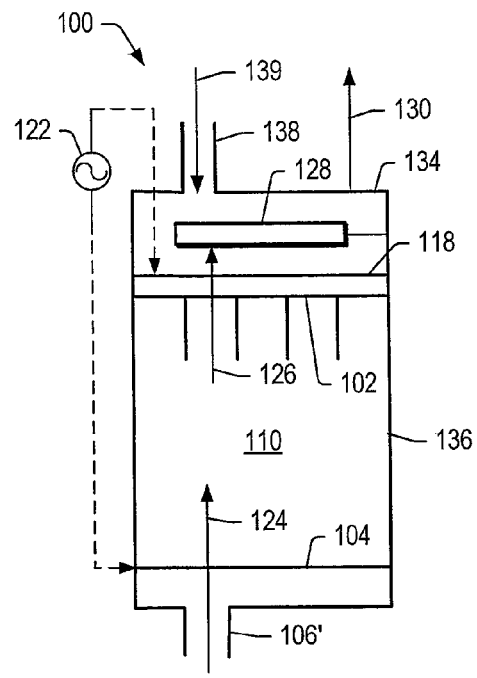
FIG. 10 depicts an embodiment of a plasma reformer that includes a catalyst zone.

FIG. 10 depicts an embodiment of a plasma reformer that includes a catalyst zone and a plasma zone. As shown in FIG. 10, catalyst system 128 is positioned in catalyst zone 134 proximate plasma zone 136. Catalyst zone 134 may be separated from plasma zone 136 by a membrane and/or other gas permeable material. In some embodiments, catalyst zone 134 is coupled to plasma reformer 100. Separation of catalyst zone 134 and plasma zone 136 may allow the reaction conditions in each zone to be varied. In some embodiments, catalyst zone 134 may include one or more catalysts. For example, catalyst zone 134 may be a stacked bed reactor. Contact of gas stream 126 with a first catalyst (for example, a platinum catalyst) and then a second catalyst (for example, a rhenium/platinum catalyst) may inhibit formation of hydrocarbons during the water gas shift reaction. Inhibition of hydrocarbon formation may enhance production of molecular hydrogen from a liquid feed.

Temperatures in plasma zone 136 may range from about 25° C. to about 400° C., about 50° C. to about 300° C., or about 100° C. to about 200° C. Temperatures of plasma in plasma reformer 100 may be at most about 400° C., at most about 300° C. or at most about 200° C. Pressure in plasma zone 136 may range from about 0.3 atm to about 5 atm, from about 0.5 atm to about 3 atm, or from about 1 atm to 2 atm. In some embodiments, one or more portions of plasma zone 136 are insulated.

Catalyst zone 134 may be operated at the same or different temperatures and pressures than plasma zone 136. Temperatures in catalyst zone 134 from about 100° C. to about 600° C., about 200° C. to about 500° C., or about 300° C. to about 400° C. Pressure in catalyst zone 134 may range from about 0.3 atm to about 10 atm, from about 2 atm to about 8 atm, or from about 3 atm to 5 atm. In some embodiments, one or more portions of catalyst zone 134 are insulated. Insulating portions of catalyst zone 134 may allow for more efficient conversion of carbon monoxide to carbon dioxide without the formation of coke and/or undesirable hydrocarbons in plasma zone 136. In some embodiments, operation of catalyst zone 134 at temperatures and/or pressures different from the temperatures and/or pressures in plasma zone 136 may allow more efficient generation of molecular hydrogen with minimal by-products.

As shown in FIG. 10, catalyst zone 134 includes inlet 138. Inlet 138 may allow liquid stream 139 (for example, water) to be injected into catalyst zone 134. Inlet 138, in some embodiments, is the same as port 106 shown in FIG. 1. Water may facilitate the conversion of carbon monoxide to carbon dioxide. Water may be delivered to catalyst zone 134 in manner that facilitates dispersion of the water in the gas present in the catalyst zone. For example, the water may be atomized, sprayed, and/or pumped into catalyst zone 134. Contact of gas stream 126 with catalyst system 128 generates molecular hydrogen enriched stream 130 as compared to the gas stream prior to contact with the catalyst system. Molecular hydrogen enriched stream 130 may exit plasma reformer and be used as an energy source.

In some embodiments, passing gas stream 126 and/or molecular hydrogen enriched stream 130 through a separation system may remove components from the gas streams and enrich or farther enrich the molecular hydrogen content of the gas streams as compared to the gas stream prior to entering the separation system. Molecular hydrogen enrichment of the gas streams may allow the molecular hydrogen stream to be used for efficiently as an energy source for devices that require molecular hydrogen as a source of fuel. As shown in FIGS. 11 through 16, plasma reformer 100 includes separation system 140. Separation system 140 includes, but is not limited to, a membrane system, an electrical swing adsorption system, a pressure swing adsorption system, or combinations thereof. Separation system 140 may be in fluid communication with plasma reformer 100. In some embodiments, purifications system 140 may lower carbon dioxide levels in the generated gas to at most about 10 ppm, at most about 5 ppm, at most about 1 ppm per volume of gas.

In some embodiments, separation system 140 is a membrane system. The membrane system may include one or more membranes capable of separating molecular hydrogen, carbon dioxide, and/or hydrocarbons from the gas stream. Removal of selected gases from the reaction stream, may allow more molecular hydrogen to be generated and/or carbon monoxide converted to carbon dioxide. Membranes may be formed from a molecular hydrogen-permeable and/or molecular hydrogen selective material such as, but not limited to, a ceramic, carbon, metal, clay, or combinations thereof. Membranes may include one or more metals from Columns 5-10 of the Periodic Table and/or one or more compounds of one or more Columns 5-10 metals. Examples of metals include, but are not limited to, palladium, platinum, nickel, silver, tantalum, vanadium, yttrium, and/or niobium. Membranes may be supported on a porous substrate such as alumina, carbon, metal oxides, or combinations thereof. The support may separate the membrane from the plasma reformer. The separation distance and insulation properties of the support may help to maintain the membranes within a desired temperature range. In certain embodiments, a membrane may be manufactured from polyamines and/or polyamides. In some embodiments, membranes may be a carbon dioxide selective material.

Figure 11:
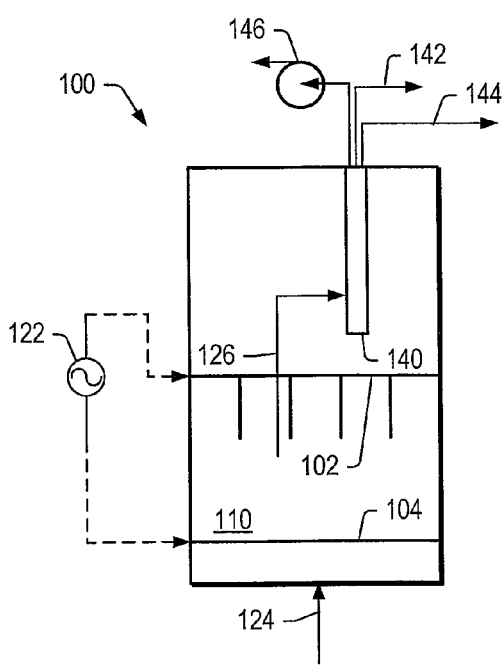
FIG. 11 depicts plasma reformer with membrane separation system inside the reformer.

FIG. 11 depicts plasma reformer with membrane separation system inside the reformer. As shown in FIG. 11, separation system 140 is positioned proximate gap 110. In some embodiments, separation system 140 removes selected gases continuously from gas stream 126 to produce molecular hydrogen stream 142 and carbon oxides stream 144. Carbon oxides stream 144 may include carbon monoxide and/or carbon dioxide. In some embodiments, separated gas stream 144 includes hydrocarbon gases. Pump 146 may assist removal of selected gases from generated gas stream by creating a pressure differential in separation system 140.

Figure 12:
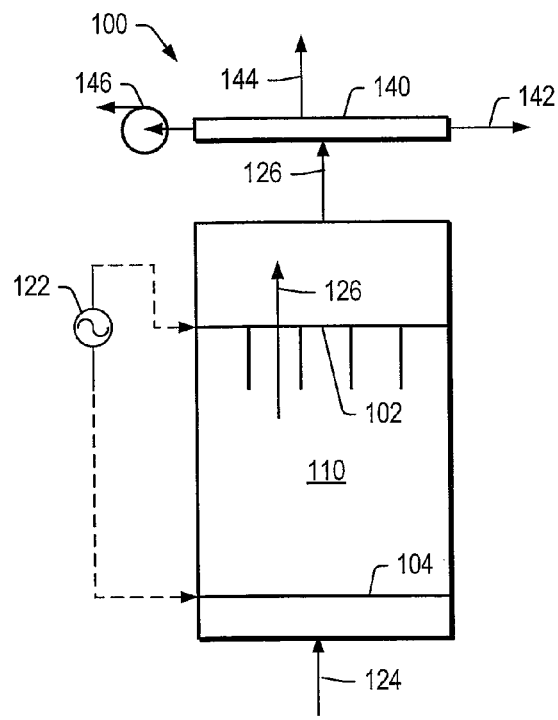
FIG. 12 depicts an embodiment of a plasma reformer with a membrane separation system coupled to the plasma reformer.

FIG. 12 depicts an embodiment of a plasma reformer with a membrane separation system coupled to the plasma reformer. As shown in FIG. 12, separation system 140 is proximate or adjacent to plasma reformer 100. Gas stream 126 exits plasma reformer 100 and enters separation system 140. In separation system 140, molecular hydrogen in gas stream 126 is separated to form molecular hydrogen stream 142 and separated gas stream 144. Molecular hydrogen stream 142 may include a minimal or trace amount of hydrocarbons and/or carbon oxides. Molecular hydrogen stream 142 may be enriched in molecular hydrogen as compared to the gas stream entering the membrane system. Molecular hydrogen stream 142 may be used as an energy source.

In some embodiments, separation system 140 may be an electrical swing adsorption system. U.S. Pat. Nos. 5,972,077; 5,925,168; and 5,912,424 to Judkins et al., each of which is incorporated herein by reference, describe electrical swing adsorption gas storage and delivery systems. Electrical swing adsorption may separate selected gases (for example, carbon dioxide and/or carbon monoxide) from the generated gas stream by adsorbing the selected gas on a sorption material. The sorption material may have enhanced sorption affinity for the selected gas upon application of current to the adsorption material. Adsorption materials used for electrical swing adsorption system include, but are not limited to, carbon, activated carbon fiber composites, and/or molecular sieves. The adsorbed gas may be removed by applying a voltage different from the original voltage applied to the material. Applying a different voltage may raise the temperature of the material and allow the gas to desorb from the adsorption material. In some embodiments, pressure of the electrical swing adsorption system may be changed to remove the adsorbed component from the material. In some embodiments, carbon oxides (for example, carbon dioxide) are the adsorbed component. The carbon oxides may be desorb from the adsorbent material and sequestered.

In some embodiments, exhaust from an internal combustion engine may be passed to the electrical swing adsorption system and/or a stream entering the electrical swing adsorption system. The carbon oxides in the exhaust may be removed from the exhaust to produce a stream having low carbon oxide levels.

Figure 13:
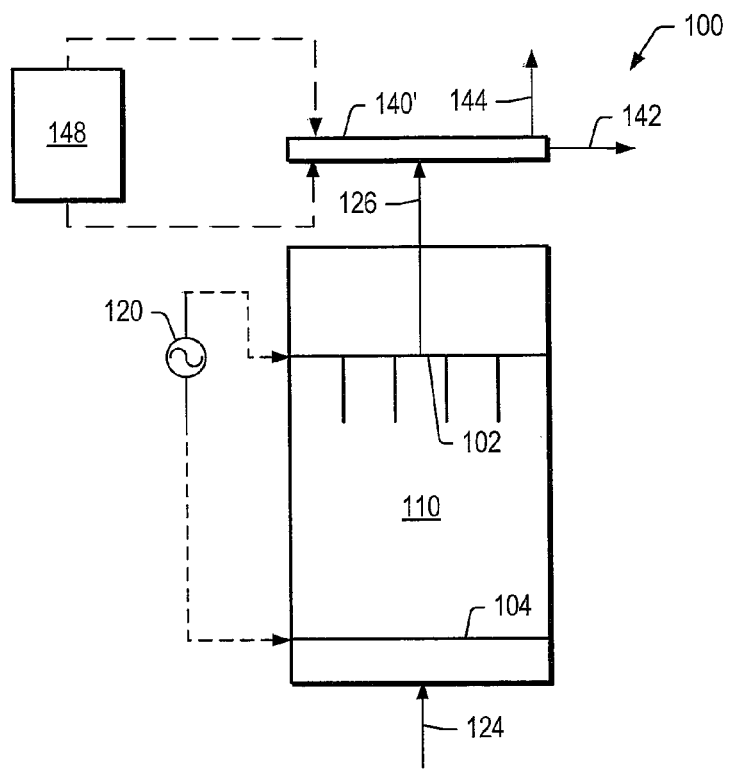
FIG. 13 depicts an embodiment of a plasma reformer with an electrical swing adsorption system.

FIG. 13 depicts an embodiment of a plasma reformer with an electrical swing adsorption system. Referring to FIG. 13, generated gas stream 126 exits plasma reformer 100 and enters electrical swing adsorption separation system 140'. In electrical swing adsorption separation system 140', electrically conductive adsorbent material is activated by current from power supply 148. Contact of gas stream 126 with the electrically conductive material may separate molecular hydrogen from gas stream 126 to form molecular hydrogen stream 142 and separated gas stream 144. Molecular hydrogen stream 142 may include a minimal amount of carbon oxides and/or hydrocarbons. Molecular hydrogen stream 142 may be enriched in molecular hydrogen as compared to the gas stream entering the electrical swing adsorption system.

Separated gas stream 144 may include carbon oxides, hydrocarbons, oxygenated hydrocarbons, vaporized feed, water, or mixtures thereof.

Figure 14:
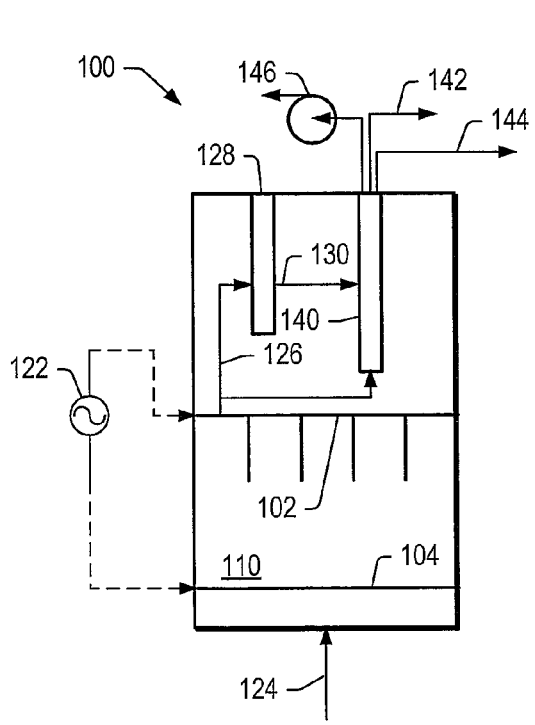
FIG. 14 depicts plasma reformer that includes a catalyst system and a membrane separation system.
Figure 15:
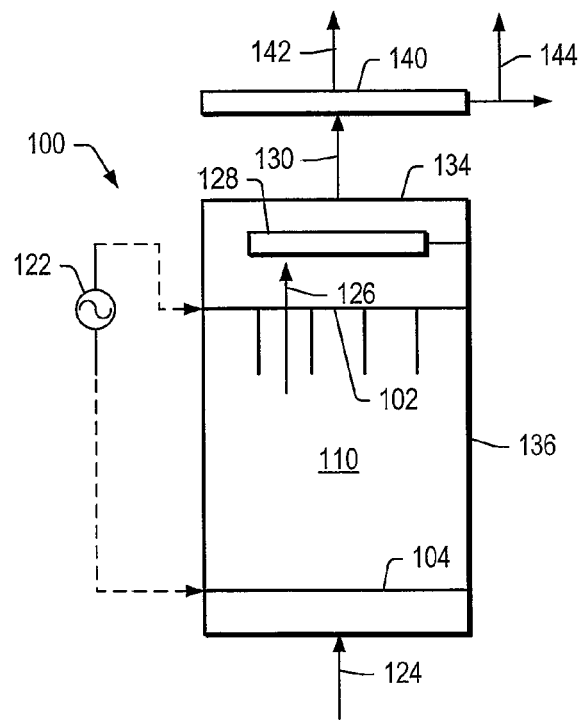
FIG. 15 depicts an embodiment of a plasma reformer that includes a catalyst and a membrane separation system.
Figure 16:
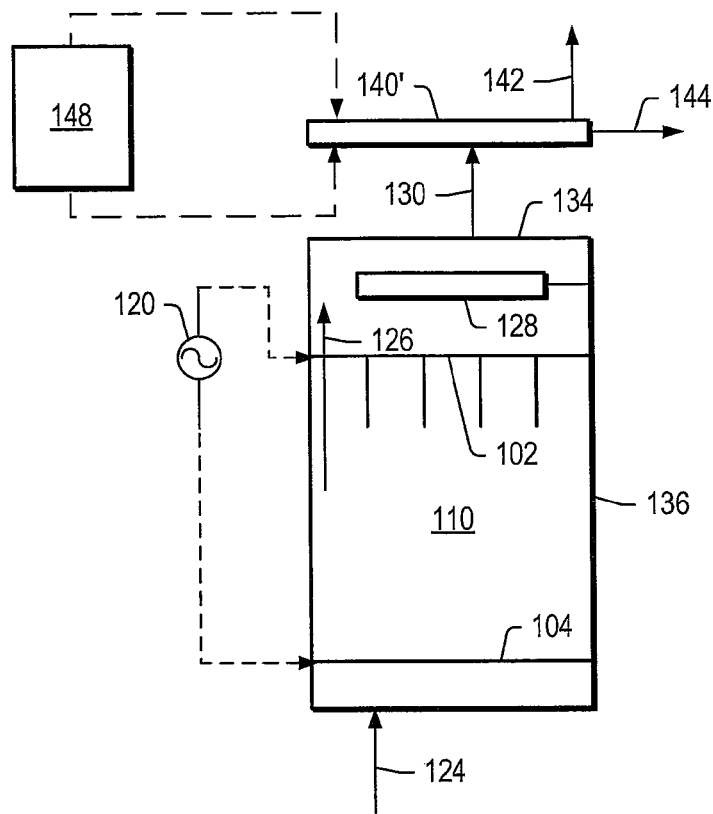
FIG. 16 depicts an embodiment of a plasma reformer that includes a catalyst and an electrical swing adsorption system.

In some embodiments, a high concentration of molecular hydrogen in the generated gas stream is desired. The combination of a water gas shift gas and separation system may produce molecular hydrogen streams that are suitable for use in devices that require high purity and/or high concentrations of molecular hydrogen. FIGS. 14-16 depict embodiments of catalyst systems and separations systems in combination with a plasma reformer.

FIG. 14 depicts plasma reformer that includes a catalyst system and a membrane separation system. As shown in FIG. 14, catalyst system 128 is positioned proximate gap 110 and membrane separation system 140. Contact of gas stream 126 with catalyst system 128 may produce molecular hydrogen enriched stream 130 as compared to the gas stream prior to contact with the catalyst. Molecular hydrogen enriched stream 130 may enter membrane separation system 140. In membrane separation system 140, molecular hydrogen may be separated from other components in the stream to form molecular hydrogen stream 142 and separated gas stream 144. Separated gas stream 144 may include carbon monoxide and/or carbon dioxide. Separated gas stream 144 may have an enriched molecular hydrogen content as compared to the gas stream entering membrane separation system 140. In some embodiments, separation system 140 removes selected gases continuously from gas stream 126 to produce molecular hydrogen stream 142 and separated gas stream 144. Pump 146 may assist removal of selected gases from generated gas stream 126 by creating a pressure differential in separation system 140.

FIG. 15 depicts an embodiment of a plasma reformer that includes a catalyst a membrane separation system coupled to the plasma reformer. As shown in FIG. 15, separation system 140 is proximate or adjacent to plasma reformer 100. Contact of gas stream 126 with catalyst system 128 may produce molecular hydrogen enriched gas stream 130 as compared to the gas stream prior to contact with the catalyst system. Molecular hydrogen enriched gas stream 130 may enter membrane separation system 140. In separation system 140, molecular hydrogen may be separated from other components in the stream to form molecular hydrogen stream 142 and separated gas stream 144. Separated gas stream 144 may include carbon monoxide and/or carbon dioxide. In some embodiments, separation system 140 removes selected gases continuously from gas stream 126 to produce molecular hydrogen stream 142 and separated gas stream 144. In some embodiments, the separation system includes a pump to create a pressure differential to assist removal of gases from the plasma reformer. Molecular hydrogen stream 142 may be enriched in molecular hydrogen as compared to the gas stream entering the membrane system.

FIG. 16 depicts an embodiment of a plasma reformer that includes a catalyst and an electrical swing adsorption system. Referring to FIG. 16, catalyst system 128 is positioned in catalyst zone 134. Electrical swing adsorption system is positioned proximate plasma reformer 100. Contact of gas stream 126, generated in plasma zone 136 from liquid feed 124, with catalyst system 128 may produce molecular hydrogen enriched stream 130 as compared to the gas stream prior to contact with the catalyst system. Molecular hydrogen enriched stream 130 may enter electrical swing adsorption separation system 140'. The separation system may be any plasma reformer/membrane electrical swing adsorption system described herein (for example, FIG. 13). In electrical swing adsorption separation system 140', electrically conductive adsorbent material is activated by current from power supply 148. Contact of molecular hydrogen enriched gas stream 130 with the electrically conductive material may separate carbon dioxide from molecular hydrogen enriched gas stream 130 to form molecular hydrogen stream 142 and separated gas stream 144. Molecular hydrogen stream 142 may include a minimal amount of carbon oxides and/or hydrocarbons. Molecular hydrogen stream 142 may be enriched in molecular hydrogen as compared to the gas stream entering the electrical swing adsorption system. In some embodiments, membrane separation system 140 and electrical swing adsorption system 140' may be used in tandem.

Plasma reformer systems described in FIGS. 1-16 and/or combinations thereof may be used to generate fuel for internal combustion engines. In some embodiments, the produced fuel is mixed with an additional fuel and then passed to the internal combustion engine. Additional fuel, includes, but is not limited to, gasoline, alcohol, gasoline, biofuels, or mixtures thereof. A mixture of generated fuel and additional fuel may provide for a better compression ratio during combustion. In some embodiments, the fuel and/or fuel mixture may be compressed prior to entering the internal combustion engine.

Combustion of the fuel and/or fuel mixture may produce energy and exhaust. The exhaust may have minimal to no pollutants (for example, NOx and/or COx compounds) due to the purity of the fuel provided to the internal combustion engine. In some embodiments, all or a portion of the exhaust may be recycled to the plasma reformer. Recycle of the exhaust may provide heat for one or more portions of the plasma reformer (for example, a catalyst zone).

Figure 17:
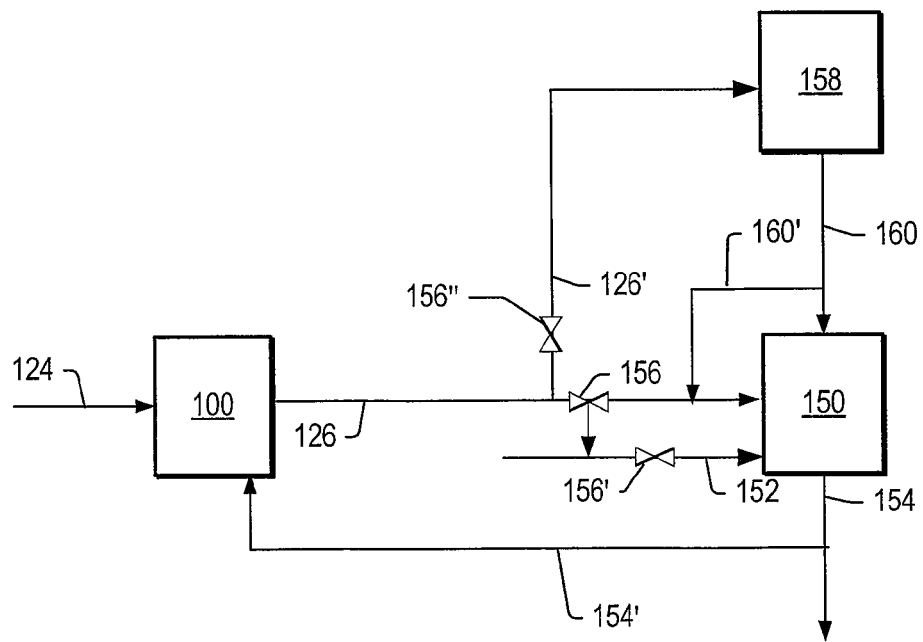
FIG. 17 depicts a system that includes a plasma reformer system and an internal combustion engine.

FIG. 17 depicts a system that includes a plasma reformer system and an internal combustion engine. Plasma reformer 100 may be any plasma reformer system described herein (for example, plasma reformer described in FIGS. 1-3 and 9-10). As shown in FIG. 17, liquid feed 124 enters plasma reformer system 100. In plasma reformer 100, liquid feed 124 is converted to gas stream 126. Gas stream 126 enters internal combustion engine 150. Alternative fuel stream 152 may enter internal combustion engine 150. In some embodiments, gas stream 126 mixes with alternative fuel prior to entering internal combustion engine 150. Internal combustion engine 150 combusts gas stream 126 and alternative fuel stream 152 to produce energy and exhaust 154.

Exhaust 154' may be recycled to plasma reformer system 100 and/or treated to remove pollutants (for example, remove NOx compounds). Gas stream and alternative fuel stream may include valves 156, 156', 156". Valves 156, 156', 156" may regulate the flow of fuel and alternative fuel to internal combustion engine 150. For example, valve 156' may be partially closed and/or fully closed when a supply of alternative fuel is minimal or low. Alternatively, valve 156' and valve 156 may be opened or closed to regulate the mixture of molecular hydrogen to additional fuel sent to internal combustion engine 150.

Gas stream 126' may enter storage unit 158. Storage unit 158 may include one or more compressors to compress gas stream 126'. Compressors include mechanical and/or chemical compressors. In some embodiments, the chemical compressor is a metal hydride compressor. Stored gas streams 160, 160' exit storage unit 158 and enter internal combustion engine 150 and/or gas stream 126 when needed. The ability to generate and store molecular hydrogen may allow energy requirements in remote and/or isolated areas to be met.

Figure 18:
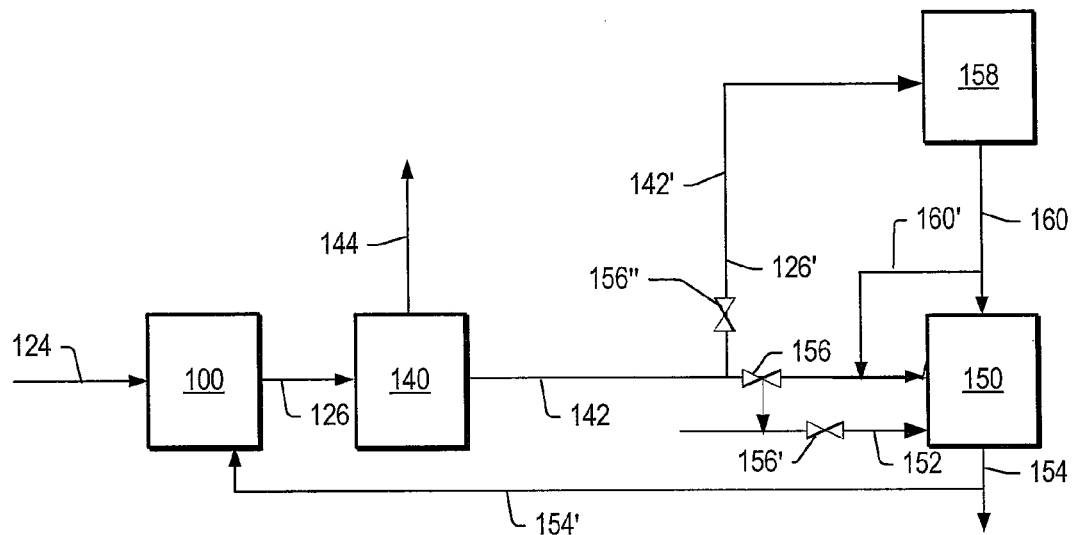
FIG. 18 depicts a system that includes a plasma reformer system, a membrane separation system, and an internal combustion engine.

FIG. 18 depicts an embodiment of a system to produce fuel that includes a plasma reformer, a membrane separation system, and an internal combustion engine. As shown in FIG. 18, liquid feed 124 enters plasma reformer system 100. Plasma reformer system 100 may be any plasma reformer system described herein (for example, plasma reformer systems described in FIGS. 1-3 and 8). In plasma reformer 100, liquid feed 124 contacts a plasma to form gas stream 126. Gas stream 126 exits plasma reformer 100 and enters membrane separation system 140. A plasma reformer-membrane separation system may be any system described herein (for example, FIGS. 11, 12, 14 and 15). In membrane separation system 140, molecular hydrogen may be separated from gas stream 126 to form molecular hydrogen stream 142 and separated gas stream 144. Separated gas stream 144 may be burned, sequestered, and/or recycled to plasma reformer 100 and/or combined with exhaust 154, 154'.

Alternative fuel stream 152 may enter internal combustion engine 150. In some embodiments, gas stream 142 mixes with alternative fuel prior to entering internal combustion engine 150. Internal combustion engine 150 combusts gas stream 126 and optionally additional fuel stream 152 to produce energy and exhaust. Exhaust 154' may be recycled to plasma reformer system 100 and/or treated to remove pollutants (for example, remove NOx compounds). Valves 156, 156', 156" may regulate the flow of fuel and alternative fuel to internal combustion engine 150.

Molecular hydrogen stream 142' enters storage unit 158. Storage unit 158 may include one or more compressors to compress gas stream 142'. Compressors include mechanical and/or chemical compressors. In some embodiments, the chemical compressor is a metal hydride compressor. Stored gas streams 160,160' exit storage unit 158 and enter internal combustion engine 150 and/or gas stream 142 when needed.

Figure 19:
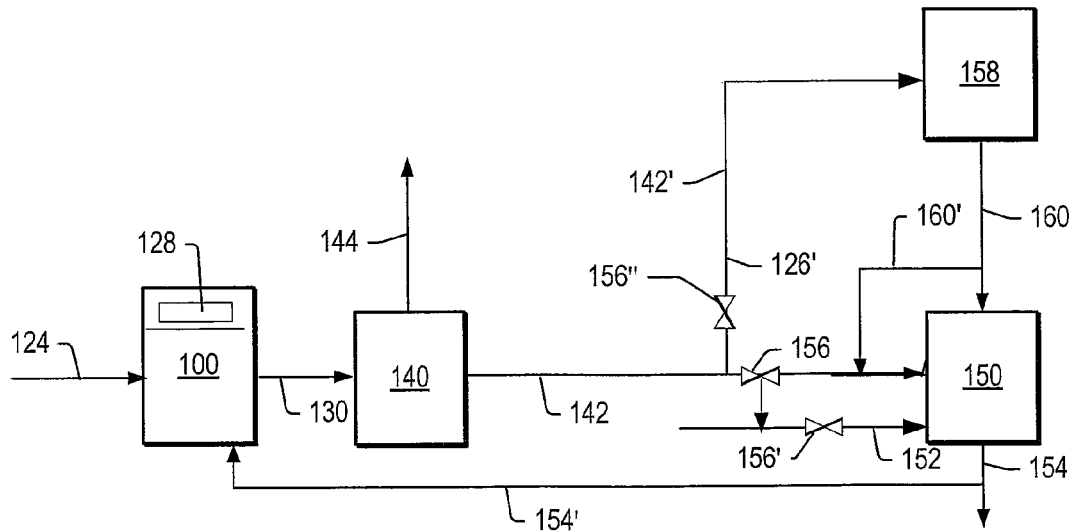
FIG. 19 depicts an embodiment of a system that includes a plasma reformer, a catalyst system, a membrane separation system, and an internal combustion engine.

FIG. 19 depicts an embodiment of a system to produce fuel that includes a plasma reformer, a catalyst system, a membrane separation system, and an internal combustion engine. As shown in FIG. 19, liquid feed 124 enters plasma reformer system 100. In plasma reformer 100, liquid feed 124 contacts a plasma to form a gas stream. The gas stream contacts catalyst system 128 as previously described herein (for example, plasma reformer systems as described in FIGS. 9 and 10) to form molecular hydrogen enriched gas stream 130 as compared to the gas stream prior to contact with the catalyst system. Molecular hydrogen enriched gas stream 130 and enters membrane separation system 140. In membrane separation system 140, molecular hydrogen may be separated from gas stream 126 to form molecular hydrogen stream 142 and separated gas stream 144. Separated gas stream 144 may be burned, sequestered, and/or recycled to plasma reformer 100 and/or combined with exhaust 154, 154'.

Alternative fuel stream 152 may enter internal combustion engine 150. In some embodiments, gas stream 142 mixes with alternative fuel prior to entering internal combustion engine 150. Internal combustion engine 150 combusts gas stream 126 and alternative fuel stream 152 to produce energy and exhaust. Exhaust 154' may be recycled to plasma reformer system 100 and/or treated to remove pollutants (for example, remove NOx compounds). Valves 156, 156', 156" may regulate the flow of fuel and alternative fuel to internal combustion engine 150.

Molecular hydrogen stream 142' may enter storage unit 156. Storage unit 156 may include one or more compressors to compress molecular hydrogen stream 142'. Stored molecular hydrogen streams 158,158' exit storage unit 156 and enter internal combustion engine 150 and/or molecular hydrogen stream 142 when needed. Molecular hydrogen stream 142' may enter storage unit 156. Storage unit 156 may include one or more compressors to compress molecular hydrogen stream 142' as described herein.

Figure 20:
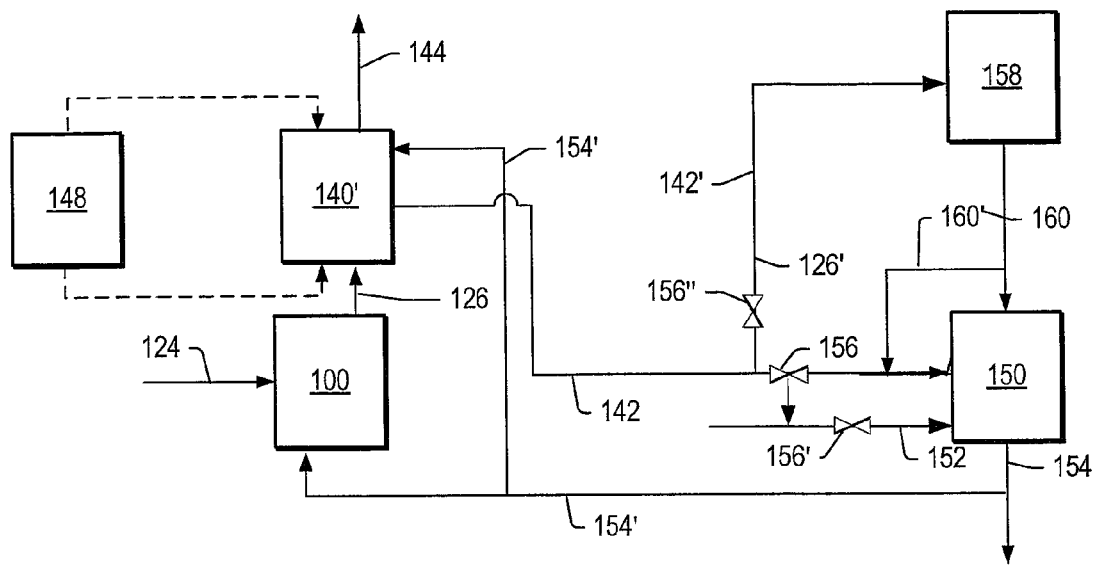
FIG. 20 depicts an embodiment of a system that includes a plasma reformer, an electrical swing adsorption separation system, and an internal combustion engine.

FIG. 20 depicts an embodiment of a system to produce fuel that includes a plasma reformer, an electrical swing adsorption separation system, and an internal combustion engine. As shown in FIG. 20, liquid feed 124 enters plasma reformer system 100. Plasma reformer system 100 may be any plasma reformer system described herein (for example, plasma reformer systems described in FIGS. 1-3 and 8). In plasma reformer 100, liquid feed 124 contacts a plasma to form gas stream 126. Gas stream 126 exits plasma reformer and enters separation system 140'. The separation system may be any plasma reformer/membrane electrical swing adsorption system described herein (for example, FIGS. 13 and 16). In electrical swing adsorption separation system 140', molecular hydrogen may be separated from gas stream 126 to form molecular hydrogen stream 142 and separated gas stream 144. Separated gas stream 144 may be burned, sequestered, and/or recycled to plasma reformer 100 and/or combined with exhaust 154, 154'. Exhaust 154' may be recycled to electrical swing adsorption separation system 140'. In electrical swing adsorption separation system 140', carbon oxides may be removed as described herein from the exhaust to produce an exhaust stream having low to minimal carbon oxides. The carbon oxides (for example, carbon dioxide) may be de-absorbed from the absorbent and sequestered.

Alternative fuel stream 152 may enter internal combustion engine 150. In some embodiments, gas stream 142 mixes with alternative fuel prior to entering internal combustion engine 150. Internal combustion engine 150 combusts gas stream 126 and alternative fuel stream 152 to produce energy and exhaust. Exhaust 154' may be recycled to plasma reformer system 100 and/or treated to remove pollutants (for example, remove NOx compounds). Valves 156, 156', 156" may regulate the flow of fuel and alternative fuel to internal combustion engine 150.

Molecular hydrogen stream 142' may enter storage unit 156. Storage unit 156 may include one or more compressors to compress molecular hydrogen stream 142'. Stored molecular hydrogen streams 158,158' exit storage unit 156 and enter internal combustion engine 150 and/or molecular hydrogen stream 142 on an as need basis. Molecular hydrogen stream 142' may enter storage unit 156. Storage unit 156 may include one or more compressors to compress molecular hydrogen stream 142' as described herein.

Figure 21:
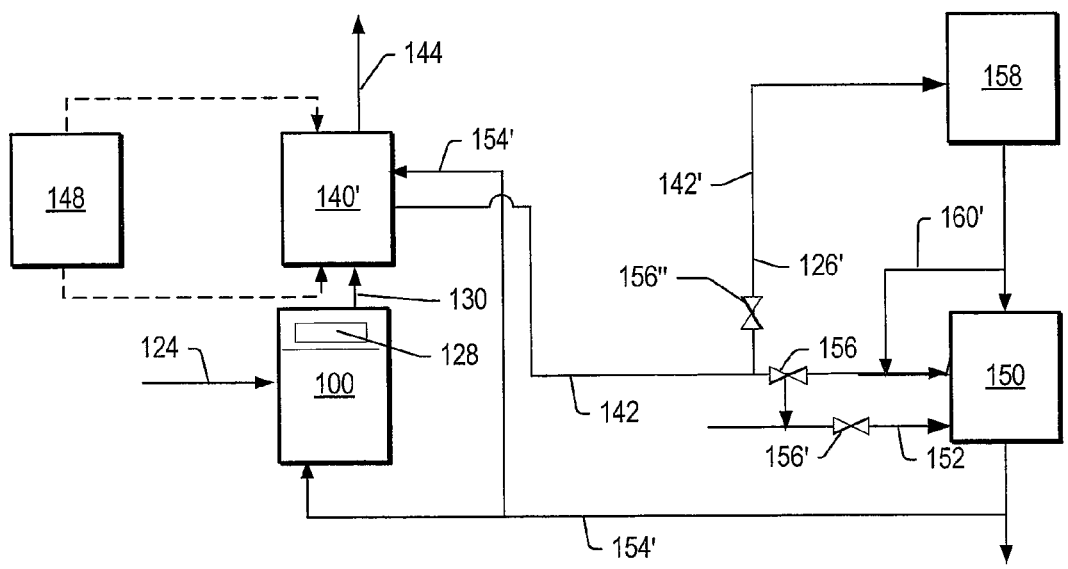
FIG. 21 depicts an embodiment of a system that includes a plasma reformer, a catalyst system, an electric swing adsorption separation system, and an internal combustion engine.

FIG. 21 depicts an embodiment of a system to produce fuel that includes a plasma reformer, a catalyst system, an electric swing adsorption separation system, and an internal combustion engine. As shown in FIG. 21, liquid feed 124 enters plasma reformer system 100. In plasma reformer 100, liquid feed 124 contacts a plasma to form gas stream 126. Gas stream 126 contacts catalyst system 128 as previously described herein (for example, as described in FIGS. 9 and 10) to form molecular hydrogen enriched gas stream 130 as compared to the gas stream prior to contact with the catalyst system. Molecular hydrogen enriched gas stream 130 and enters electrical swing adsorption separation system 140'. In electrical swing adsorption separation system 140', molecular hydrogen may be separated from gas stream 126 to form molecular hydrogen stream 142 and separated gas stream 144. Separated gas stream 144 may be burned, sequestered, and/or recycled to plasma reformer 100 and/or combined with exhaust 154, 154'. Exhaust 154' may be recycled to electrical swing adsorption separation system 140'. In electrical swing adsorption separation system 140', carbon oxides may be removed as described herein from the exhaust to produce an exhaust stream having low to minimal carbon oxides. The carbon oxides (for example, carbon dioxide) may be de-absorbed from the absorbent and sequestered.

Alternative fuel stream 152 may enter internal combustion engine 150. In some embodiments, gas stream 142 mixes with alternative fuel prior to entering internal combustion engine 150. Internal combustion engine 150 combusts gas stream 126 and alternative fuel stream 152 to produce energy and exhaust. Exhaust 154' may be recycled to plasma reformer system 100 and/or treated to remove pollutants (for example, remove NOx compounds). Valves 156, 156', 156" may regulate the flow of fuel and alternative fuel to internal combustion engine 150.

Molecular hydrogen stream 142' may enter storage unit 156. Storage unit 156 may include one or more compressors to compress molecular hydrogen stream 142'. Stored molecular hydrogen streams 158,158' exit storage unit 156 and enter internal combustion engine 150 and/or molecular hydrogen stream 142 when needed. Molecular hydrogen stream 142' may enter storage unit 156. Storage unit 156 may include one or more compressors to compress molecular hydrogen stream 142' as described herein.

EXAMPLE

A non-limiting example of systems and methods to generate molecular hydrogen from a liquid feed using low-temperature plasma described herein is described below.

Example

A tubular reactor was equipped with two vertically oriented electrodes with a ½ inch quartz tube (plasma generating zone) positioned between the electrodes. The cathode electrode (¼" stainless steel tube) was positioned at the bottom of the tubular reactor. The cathode electrode included an opening to allow generated gas to leave the reactor. The anode electrodes (10 1/16" inch stainless steel needles) were positioned at the top of the tubular reactor. The anode electrodes were connected to a pump that delivered aqueous ethanol into the plasma-generating zone. Anode electrodes were connected to a high voltage amplifier (Trek 20/20C) equipped with a pulse signal input (HP), and the cathode electrode was grounded. The gap between the anode and cathode electrodes was 15 mm. Temperature of the plasma in the gap was estimated to be between 260° C. and 280 ° C. using an IR digital temperature probe.

Catalysts listed in TABLE 1 were positioned next to the plasma zone. In certain runs, as indicated in TABLE 1, the catalyst zone was insulated. Temperature in the catalyst zone was maintained at 300° C. Catalysts were prepared as described herein.

An aqueous solution of ethanol (35 vol % ethanol) was fed to the plasma reactor at the flow rates listed in TABLE 1. Plasma was generated under the following conditions: voltage RMS 3.93 kV; current RMS 2.25 kV; frequency 5.99 kHz; power RMS 3 W. Products generated from the reforming of ethanol by low-temperature plasma are listed in TABLE 1 and TABLE 2.

$Pt/TiO_2$ Catalyst

The $Pt/TiO_2$ catalyst was prepared by the following method. $TiO_2$ (Degussa $TiO_2$ P25, Evonik Degussa, Germany) powder was impregnated with $H_2PtCl_6$ solution at room temperature for twelve hours to form a platinum/titanium oxide mixture. The platinum/titanium oxide mixture was dried at 100° C. for twelve hours and then calcined in air at 400° C. for four hours.

$Re/Pt/TiO_2$ Catalyst

The $Re/Pt/TiO_2$ catalyst was prepared by the following method. $TiO_2$ (Degussa $TiO_2$ P25, Evonik Degussa, Germany) powder was impregnated with a $NH_4ReO_4$ solution at room temperature for one hour and then impregnated with a $H_2PtCl_6$ solution at room temperature for twelve hours to form a platinum/titanium oxide mixture. The rhenium/platinum/titanium oxide mixture was dried at 100° C. for twelve hours and then calcined in air at 400° C. for four hours.

TABLE 1

| Catalyst Amount | Flow rate mL/min | $H_2$ Vol % | $CO_2$ Vol % | CO Vol % | $CH_4$ Vol % | $C_2H_6$ Vol % | Insulated |
|---|---|---|---|---|---|---|---|
| None | 87.8 | 63.9 | 4.96 | 30 | 0.37 | 0.26 | |
| 1 gram 1% $Pt/TiO_2$ | 98.4 | 70.1 | 12.3 | 15.5 | 0.57 | 1.34 | No |
| 1 gram 1% $Pt/TiO_2$ | 102.5 | 74.2 | 20 | 4.3 | 0.64 | 0.79 | Yes |
| 1 gram 2% $Pt/TiO_2$ | 111.6 | 73.7 | 20.6 | 3.83 | 0.69 | 1.10 | No |
| 1 gram 2% $Pt/TiO_2$ | 89.5 | 69.8 | 21.5 | 4.09 | 3.2 | 1.38 | Yes |
| 2 gram 2% $Pt/TiO_2$ | 115.4 | 74.7 | 21.3 | 2.42 | 0.6 | 0.95 | Bottom portion |

TABLE 2

| Catalyst Amount | Flow rate (mL/min) | EtOH Conversion (%) | Gas composition (%) | | | | |
|---|---|---|---|---|---|---|---|
| | | | $H_2$ | $CO_2$ | $C_2H_6$ | $CH_4$ | CO |
| 1 gram $Pt/TiO_2$ | 103 | 94 | 74.2 | 20.0 | 0.79 | 0.64 | 4.30 |
| 0.6 gram of 1 wt % Pt—Re/$TiO_2$ | 106 | 94.4 | 72.6 | 21.6 | 1.2 | 1.1 | 3.5 |
| 0.4 gram $Pt/TiO_2$ and 0.6 gram wt % Re/Pt/$TiO_2$ | 109 | 96.6 | 73.3 | 23.6 | 1.4 | 0.9 | 0.8 |

Example 2

The plasma reformer as described in Example 1 without catalyst was run at 5 psig and 10 psig. The results of at experimental conditions, various pressures, and products formed are listed in TABLE 3.

TABLE 3

| Experiment condition | 5 psig | 10 psig |
|---|---|---|
| H$_2$O/EtOH ratio | 3.24 | 3.24 |
| Feed rate (mmol/min) | 1.15 | 1.00 |
| Voltage RMS (kV) | 4.05 | 4.66 |
| Current RMS (mA) | 2.20 | 2.17 |
| Frequency (kHz) | 6.54 | 6.20 |
| Power RMS (W) | 2.97 | 3.51 |
| Summary | | |
| H$_2$ + CO Productivity (sccm) | 139.2 | 131.4 |
| H$_2$ selectivity | 111% | 120% |
| CO selectivity | 82% | 87% |
| CO$_2$ selectivity | 7% | 7% |
| HC selectivity | 11% | 6% |
| Reformer efficiency | 79% | 82% |

Selectivity of COx=mole of product COx/(2×mole of converted ethanol)×100.

Selectivity of H$_2$=mole of product H$_2$/(3×mole of converted ethanol)×100.

Converted ethanol was the total number of moles of ethanol in the following reactions:

$$C_2H_5OH+H_2O=2CO+4H_2$$

$$C_2H_5OH+H_2=2CH_4+H_2O$$

$$C_2H_5OH=C_2Hx+H_2O+yH_2,$$

which was back calculated fro mole products CO, C$_2$Hx and CH$_4$. CO, C$_2$Hx, and CH$_4$ were determined using on line gas chromatography with absolute calibrations. The conversion was then calculated based on the following formula Ethanol conversion=(mole ethanol converted)/mole ethanol×100, where mole ethanol input was calculated from the feed rate of ethanol and water mixture.

In this patent, certain U.S. patents and U.S. published patent applications have been incorporated by reference. The text of such U.S. patents and U.S. published patent applications, however, only incorporated by reference to the extent that no conflict exists between such text and the other statements and drawings set forth herein. In the event of such conflict, then any such conflicting text in such incorporated by reference U.S. patents and U.S. published patent applications is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of production of fuel for an internal combustion engine using a plasma generated at a pressure between about 0.3 atmospheres and about 5 atmospheres, comprising:
   providing a liquid feed to a plasma reformer;
   contacting the liquid feed with a low-temperature plasma generated in the plasma reformer to produce a gas stream comprising hydrogen and carbon oxides, wherein a total pressure of the plasma reformer is between about 0.3 atmospheres and about 5 atmospheres; and
   providing the gas stream to an internal combustion engine.

2. The method of claim 1, wherein the liquid feed comprises oxygenated hydrocarbons.

3. The method of claim 1, wherein the gas stream comprising hydrogen and carbon oxides comprises at most about 50 ppm by volume of carbon monoxide.

4. The method of claim 1, wherein the plasma has a temperature of at most about 400° C.

5. The method of claim 1, wherein the liquid feed comprises ethanol.

6. The method of claim 1, further comprising compressing the gas stream prior to providing the gas stream to the internal combustion engine.

7. The method of claim 1, further comprising combusting at least a portion of the gas stream in the internal combustion engine to produce energy and exhaust.

8. The method of claim 7, further comprising transporting a portion of the exhaust to the plasma reformer.

9. The method of claim 1, further comprising dispersing the liquid feed into a gap between a cathode electrode and one or more anode electrodes of the plasma reformer.

10. The method of claim 1, further comprising dispersing the liquid feed into a gap between a cathode electrode and one or more anode electrodes of the plasma reformer, wherein the gap ranges from about 1 millimeter to about 100 millimeters.

11. The method of claim 1, wherein the liquid feed contacts the plasma at a temperature of greater than about 50° C. and a pressure of greater than about 1 atm.

12. The method of claim 1, wherein the liquid feed comprises at least 5 vol % oxygenated hydrocarbons based on the total volume of the liquid feed.

13. The method of claim 1, wherein the liquid feed comprises hydrocarbons.

14. The method of claim 1, wherein the liquid feed comprises oxygenated hydrocarbons and hydrocarbons.

15. The method of claim 1, wherein the liquid feed comprises water and oxygenated hydrocarbons.

16. The method of claim 1, further comprising flowing the liquid feed through an inlet of the plasma reformer such that the liquid feed flows in a direction parallel to a cathode electrode of the plasma reformer.

17. The method of claim 1, further comprising flowing the liquid feed through an inlet of the plasma reformer such that the liquid feed flows in a direction perpendicular to a cathode electrode of the plasma reformer.

18. The method of claim 1, wherein the liquid feed comprises water.

19. The method of claim 1, wherein the plasma is non-arcing.

* * * * *